United States Patent [19]
Reimer et al.

[11] Patent Number: 5,917,180
[45] Date of Patent: Jun. 29, 1999

[54] PRESSURE SENSOR BASED ON ILLUMINATION OF A DEFORMABLE INTEGRATING CAVITY

[75] Inventors: Ernest M. Reimer, Outer Cove; Lee Danisch, Fredericton, both of Canada

[73] Assignee: Canadian Space Agency, Canada

[21] Appl. No.: 08/895,268

[22] Filed: Jul. 16, 1997

[51] Int. Cl.[6] .................................................. H01J 5/16
[52] U.S. Cl. .................... 250/227.14; 250/231.1; 340/555
[58] Field of Search .................... 250/227.14, 227.16, 250/227.18, 231.1; 340/541, 555–557; 73/768, 774, 783; 356/32–35

[56] References Cited

U.S. PATENT DOCUMENTS 5,026,984    6/1991    Gerdt ................................ 250/227.21

*Primary Examiner*—Que T. Le
*Attorney, Agent, or Firm*—David J. French

[57] ABSTRACT

A pressure sensor relies on detecting multiply scattered light within an optical cavity. Changes in the volume of the cavity are sensed by the change in sampled light intensity. Pressure sensitive mats with a high density of sensor are assembled using optical fiber technology.

25 Claims, 8 Drawing Sheets

20 TAPE SENSORS
(3000 x 1.0 x 0.8 MM,
0.25 MM FIBER)

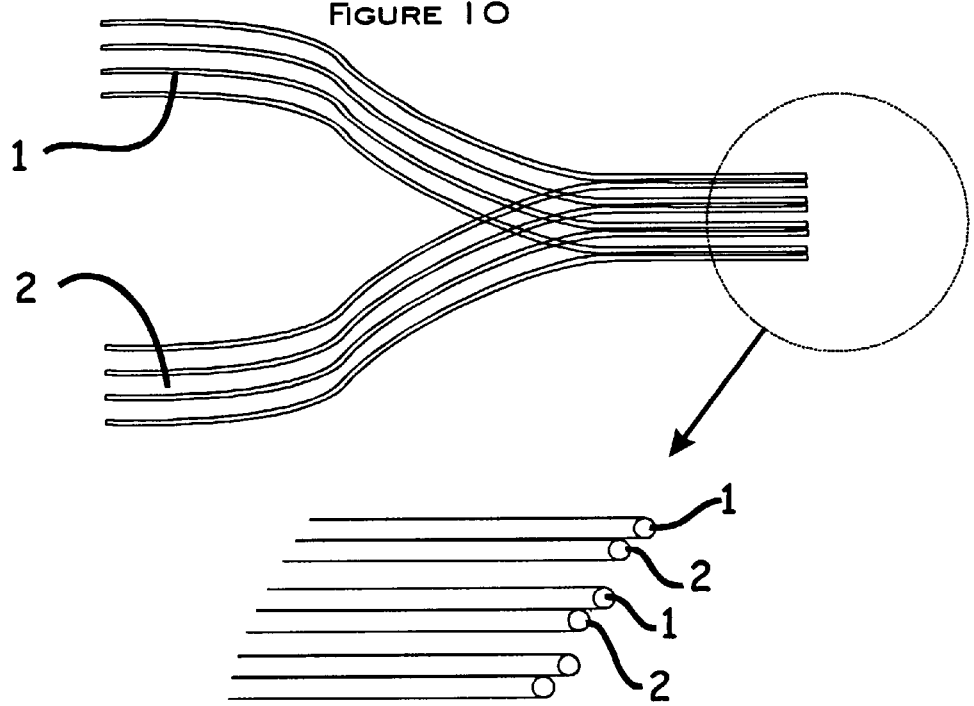
FIGURE 10
FIGURE 10a
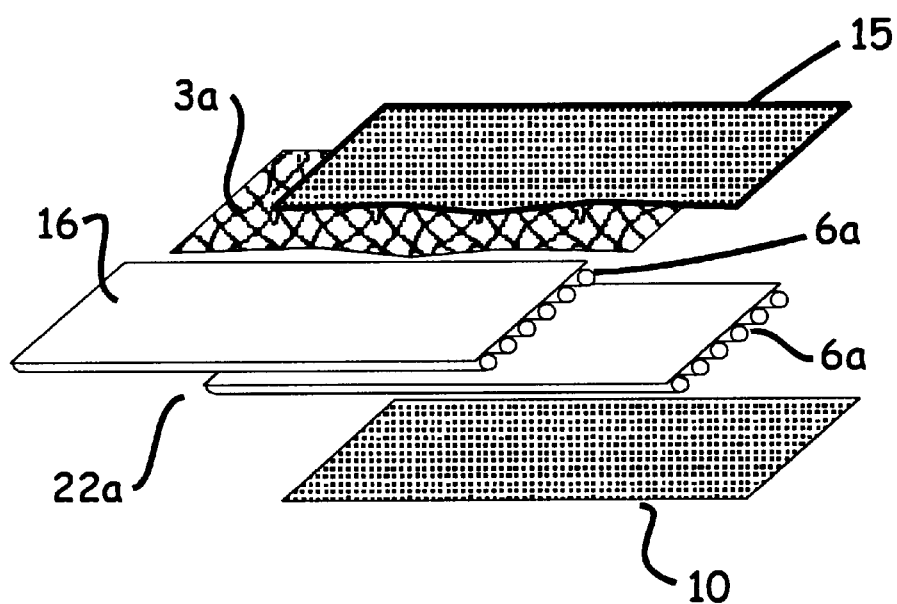
FIGURE 11

PRESSURE SENSOR BASED ON ILLUMINATION OF A DEFORMABLE INTEGRATING CAVITY

FIELD OF THE INVENTION

This invention relates to pressure sensors. In particular, it relates to a light scattering apparatus wherein the brightness of scattered light varies with the volume of the cavity or volume containing the scattered light to permit it to be used as a measure of applied pressures.

Applications extend to all fields wherein it is desired to detect the existence of, or change in, a pressure condition. In particular, this includes contact sensing arrays for sensor mats and robot grippers.

BACKGROUND TO THE INVENTION

The use of light to detect a pressure condition is known. In particular fiber optic cables and optical fibers have been used to detect pressure conditions.

In U.S. Pat. No. 4,845,357 (Brennan) back-scattered light arising within an optical fiber through the flexing of the fiber is detected. The fiber, operating in reflex mode, is embedded in a structure. The detected signal is used to activate piezoelectric elements attached elsewhere in the structure. See also U.S. Pat. No. 4,714,829 (Hartog et al) in a similar vein.

In U.S. Pat. No. 4,701,614 (Laeger) an optical fiber serves to sense pressure applied laterally to its side by the modulating effect that the deformation of the fiber wall has on the transmission of light within the fiber. See also U.S. Pat. No. 4,915,473 (Haese).

In U.S. Pat. No. 4,634,858 (Gerdt), an optical fiber coupling senses stress through variations in the index of refraction of a medium through which light is passed.

U.S. Pat. No. 5,425,273 (Chevalier) discloses a pressure sensor wherein an optical fiber terminates in a deformable, elastic and optically transparent material containing inclusions in the form of segments of optical fiber whose separating distances vary under applied pressure to modify the focal length of an optical system that reflects light back into the optical fiber.

A high pressure sensor based upon the optical detection of the deformation of a hollow glass sphere is described in an article: "A Novel Hollow—Glass Microsphere Sensor for Monitoring High Hydrostatic Pressure" by M. G. Xu and J. P. Dakin published in 2/SPIE Vol. 1795, Fiber Optic and Laser Sensors X (1992). The deformation under pressure of the sphere was detected by reflecting laser light supplied from an optic fiber off of the inner surfaces of the glass sphere. The reflected signals were analyzed in the manner of a Fabray-Perot interferometer for interference effects to sense deflections. No reliance upon scattered light occurs in this disclosure.

Sensors which rely upon reflected light to measure an external phenomon or influence that affects reflected or back-scattered light include:

(1) U.S. Pat. No. 4,599,908 (Sheridan)—pressure is sensed by constriction of compression-occluded holes located in the path of a reflected light beam;
(2) U.S. Pat. No. 4,155,065 (Stimler)—a doppler laser particle motion detector is used to detect acoustic waves passing through a suspension of light scattering particles carried within a liquid;
(3) U.S. Pat. No. 4,691,709 (Colien)—blood pressure at the distal end of a catheter, is sensed by the modulating effect of pressure on a flexible mirror presented before the end of an optical fiber light guide, operating in reflex mode;
(4) U.S. Pat. No. 3,580,082 (Strack)—detects pressure by sensing the change in intensity of light reflected off of a deflecting membrane which directs light to alternate light sensing fibers;
(5) U.S. Pat. No. 4,986,671 (Sun) relies upon an illuminating/receiving optical fiber operating in reflex mode to measure pressure applied to a deformable elastomeric material applied to the active end of optical fiber. Displacement of a reflective layer formed on the surface of the elastomeric material towards the optical fiber affects the level of optical coupling between the two modes in which the fiber is operating. This variation serves as a measure of the force or pressure applied at the fiber end; and
(6) U.S. Pat. No. 4,870,271 (Philips)—a contacting sensor is based upon the reception of light reflected back from a deflecting, cantilevered spring. The spring is illuminated by light emitted from an optical fiber towards which the spring may deflect, and sensed by a paired optical fiber positioned adjacent to the illuminating fiber.

The Philips, Sun and other patents describe pressure sensing systems in which a pressure-induced deflection of a resilient member towards a light sensor is detected by the change in brightness of an illuminated surface. The sensor viewing the illuminated surface in these references is oriented towards the deflecting surface and the source of applied pressure. This limits the mechanical configuration of the combined pressure sensing system. In particular, Philips and Sun do not provide a means for detecting pressure applied obliquely or laterally to the viewing orientation of the light sensor.

Further, none of these references rely upon the change in the integrated intensity of multiply scattered wave energy, e.g. light, present within a volume which is akin to an "integrating cavity", or "integrating optical cavity" as the volume of such cavity is varied. ("Multiply" is used herein in its adverb sense.)

An integrating cavity or volume as used herein is similar to in certain aspects to an "Integrating Sphere". An Integrated Sphere is defined in The Photonics Dictionary 1997—Publisher Laurin Publishing Co. Inc., Pittsfield, Mass. at page D-72 as:

"A hollow sphere, coated internally with a white diffusing material and provided with openings for incident beam, specimen, and detector, used for measuring the diffuse reflectance or transmittance of objects."

The light within such a volume is repeatedly scattered to such an extent that it is locally nearly isotropic in character, i.e. its intensity at a point is virtually the same when measured in all directions. Such a sphere is used to measure the total quantity of light emitted from a source.

The effect of pressure on a compressible, light scattering medium or volume that is volumetrically compactable and which contains scattered light or wave energy has not been exploited in any publicized devices. An opportunity exists to create a pressure sensing device and system which is capable of providing, at reasonable cost, a measure of applied pressure, both locally and over a specific surface area, relying upon the detection of scattered light or wave energy. The invention herein addresses those objects.

Prior art designs tend to be limited by the necessity of viewing a pressure responding surface that is displaced axially towards a sensor. This limits the use of such configurations because they are insensitive, or are relatively insensitive, to laterally-applied pressure. By providing a sensor arrangement that is sensitive to laterally-applied pressure it becomes possible to construct an array that provides a pressure sensitive surface of substantial area and minimal thickness at relatively low cost. This is, therefore, a further object of the present invention.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In one general sense, the invention is directed to a pressure sensor comprising:

(1) a compressible carrier medium of wave energy transmitting material having an outer boundary;

(2) a wave energy source coupled to said carrier medium;

(3) wave energy scattering centers dispersed within said carrier medium to create a scattered energy volume containing scattered wave energy;

(4) a wave energy receiver responding to the integrated intensity of scattered wave energy within the scattered energy volume; and (5) signal coupling means connected to the wave energy receiver for transferring signals therefrom to a pressure indicator, wherein, upon displacement of the outer boundary, the dimensional volume of the scattered energy volume changes in response to changes in an externally applied pressure to provide a change in the intensity of scattered wave energy therein to provide a signal to permit the pressure indicator to produce a measure of the applied pressure.

As a preferred variant the wave energy is light, the carrier medium is translucent and diffusively scatters light, the wave energy source is a light source, and the wave energy receiver is a light sensor. Further, preferably, the sensor does not intercept light originating directly from the light source.

As a further variant, the invention includes a pressure sensor comprising:

(1) a source of illumination;

(2) a compressible light scattering medium or hollow, compressible structure defining an integrating cavity within which light from the source of illumination is diffused and integrated through multiple scattering;

(3) a light sensing means directed in a viewing direction to sample diffused and integrated light arising from multiple scattering within the integrating cavity and provide a signal indicative of the intensity of the diffused and integrated light; and (4) signal coupling means connected to the light sensing means for transferring the signal to a pressure indicator, wherein the volume of the integrating cavity changes in response to changes in externally applied pressure to provide a variation in the intensity of the diffused and integrated light so that a signal is thereby produced to permit the pressure indicator to provide a measure of the applied pressure. Advantageously, the volume of such an integrating cavity is responsive to externally applied pressure that is applied laterally to the viewing direction thus permitting measurement of laterally applied pressure.

The invention is based upon the principle of the detection of the intensity—brightness—of diffuse, multiply scattered illumination present within, or contained by the surface of, a compressible, light scattering structure defining an integrating optical cavity. Such detected intensity is used as a means of effecting a measure of applied pressure.

An integrating optical cavity herein is defined as a region or volume within a material, or bounded by a structure, with a characteristic such that illumination within the cavity undergoes multiple scattering reflections or refractions to thereby become effectively randomized smoothed-out in its distribution throughout the cavity. In such a cavity, at the limit, information about the original direction of illumination is eventually lost.

An example of one variant of such a cavity would be an optical integrating sphere of the type which is typically used to measure the absolute photometric brightness of a light source without regard to the specific geometry of the source. In such an integrating sphere the walls and all internal structures are coated with a white diffusely reflecting surface and the photometer is located in such a way that light from the source must be reflected one or more times in order to reach it.

An integrating optical cavity as used herein, however, may be an air or gas-filled volume, or may be a volume occupied by a translucent solid such as an open-cell or closed-cell foam matrix that provides optical scattering centers.

It is a characteristic of such a cavity that, for a light source with constant power output, the light intensity within the cavity is a function of the volume of the cavity, the dimensions of the light source and the reflectance of the walls, when walls are present. This invention preferably relates to a cavity which is relatively large by comparison with the light source and in which the reflectance of the walls, when walls are present, is good but is less than perfect. (If perfect reflectance exists, the intensity of scattered light will not vary with changes in cavity volume.) For example, the area of the walls might be 10 times to 1000 times the area of the light source and the wall reflectance might be 50% to 99.9%. If such a cavity were to expand or contract without any other change, the internal intensity of scattered light present therein would vary in an inverse relation to the volume of the cavity.

Such a cavity need not be spherical. Any arbitrary shape will have similar characteristics although extreme shapes may not respond ideally.

It is also a characteristic that such cavities are insensitive to the exact location and orientation of the source and of the photometer. Similarly, the field of illumination emanating from the source and the field of view of the photometer are not constrained except that the photometer should preferably not view the source directly.

For practical purposes an integrating optical cavity could be constructed by placing a light source and a photometer inside a white latex balloon. Such a structure could expand or contract with changes in external atmospheric pressure and the photometer would provide a signal that would increase as the external pressure increases.

An optical cavity which is equivalent in a sense to an integrating sphere can also be created by embedding a light source and photometer inside a light scattering medium. The medium may be a transparent material or fluid containing dispersed scattering centers. The scattering centers may be reflective or refractive and may scatter in the Rayleigh, MIE or geometric range. The scattering centers should be small compared to the mean free path of light within the medium.

Scattering as defined herein may be either reflective or refractive. The essential characteristic is that light be redirected. This capacity of scattering centers to achieve this effect must persist as the cavity with which they are associated changes in volume. Typically, their scattering character will be individually invariant with changes in such volume. Where such characteristics do vary with volume, it is sufficient for the overall intensity of scattered light within the volume to vary to some degree with variations in the cavity dimensions.

As the light is multiply scattered within the cavity, it will tend to become more homogenous. By this process, the light will become integrated, i.e. smoothed or averaged-out within the confining space through accumulated scattering. As multiple scattering progresses, the light within the cavity will tend towards being locally isotropic, even if it has only a partially isotropic aspect as where a radial intensity gradient is present.

In the case of a light scattering medium with distributed scattering centers within its volume it is normal to define the mean free path as the characteristic scattering length. This is the distance which light can travel with about a 63% chance of encountering a scattering center. Under this circumstance there will be, within the light scattering medium, an illuminated region surrounding the light source which has similar properties to those of the hollow, bounded cavity previously described. (Both are included herein within the meaning of an "optical cavity"). The radiation field within the optical cavity surrounding the light source will be randomized and will have an intensity that is inversely related to the characteristic scattering length in the same way that the hollow cavity intensity is related to the overall cavity volume. Due to the inevitable absorptive losses that occur, the intensity of the scattered light will decline as proceeding further from the source.

If, in the case above, the translucent light scattering medium is compressible, the scattering centers will become more closely packed when the medium is compressed. As a consequence the characteristic scattering length will decrease and the local radiation field in the vicinity of the light source will become more intense. A photometric detector in the same vicinity will record an increase in signal. A cavity constructed in this way need have no defined material structure, yet nevertheless it exhibits a predictable response to compressive deformation. Further it responds uniformly to a uniformly compressive deformation regardless of the direction of applied force.

Both constructions of optical cavity, the "hollow medium with scattering boundary surfaces" and "the scattering medium", can be configured as pressure sensors and in practice the two constructions can be mixed in a single device.

The characteristics of the scattering medium suited for use with this variant of the invention are as follows:

structurally self-supporting compressible i.e. volumetrically compactable elastically resilient (optional)

at least partially transmissive of light, e.g.—translucent scattering centers which change density upon compression of the medium As the density of scattering centers rises in response to applied pressure the brightness of scattered light increases in the region proximate to the light source. Also, the zone of concentrated illumination arising from scattered light contracts in volume, reducing the brightness of scattered light in regions remote from the light source. While a region of inflection exists between the two, applied pressure will result in changes of brightness occurring in both the proximate and remote regions. Preferably, the invention relies upon the detection of brightness in zones wherein the intensity of illumination arising from scattered light increases as the light scattering centers become more densely packed.

A preferred configuration for the invention is to position the source of illumination and the light sensing means so that the viewed field of the sensor overlaps the field of scattered light without receiving any direct illumination from the light source. This condition is met by placing the source and sensor side by side with both oriented towards the same illuminated regions of the light scattering body.

If the sensor detects some light that has not been integrated through multiple scattering, e.g., light arising directly from the source or from a directly illuminated stationary surface within the integrating cavity, the signal component from this type of light will not vary with changes in the volume of the cavity in the same manner as the integrated light. These sensed inputs can be differentiated through subsequent processing of the signal to separate-out the component arising from the detection of integrated, scattered light. In this way, even if a mixture of input modes is present, the system is capable of responding to the changes in the multiply scattered component of light being sensed.

Preferably the sensor should be arranged to avoid picking-up the other, less or unresponsive components of illumination within the cavity. For example, the source of illumination should not be viewed directly. Put alternately, the field of view of the sensor should not include the source of illumination. Otherwise processing of the output signal might be required to separate the differing effects.

In another variant of the invention the light diffusing medium is in the form of a flexible foam sheet, or a solid sheet of elastically resilient polymeric material that is diffusively reflecting. This sheet is positioned to overlie the optical source and sensor to provide an illuminated cavity containing scattered light. The volume of the cavity will become reduced in size upon the application of pressure to the sheet overlying the optical sensor by reason of the deflection of the sheet and the intensity of light within the cavity will increase. At the same time the brightness of scattered light within the foam, when foam is employed, will also increase with its compression. This zone of scattered light within the foam may be said to also be included as part of the optical cavity.

Whether an incompressible or compressible translucent sheet is employed, when the sheet is placed to overlie a source of illumination at an oblique angle to the direction of illumination to form a cavity therebetween, the pressure that is applied to the sheet may conveniently originate from a direction that is transverse or obliquely oriented to the direction of illumination. In either case, applied pressure is sensed by the associated change in perceived brightness of multiply scattered, diffusively reflected light present within the illuminated optical cavity defined by or existing within the reflecting or light scattering body as pressure is applied thereto.

Optionally, a protective outer covering may be provided to exclude ambient light from entering the illuminated cavity. The cavity-defining side of the surfaces of either type of cover sheet, as well as other surfaces defining the boundaries of the cavity, may be rendered more or less reflective to adjust the performance of the sensor.

Any type of wave energy sensor or light detector may be employed in the invention. A preferred means of supplying illumination and detecting the light that is being modulated by the application of pressure is through use of optical fibers.

In a preferred variant, optical fiber ends which serve as light sensors are deployed within or beneath a pressure sensitive, light modulating medium. Further, this light modulating medium may be illuminated by optical fibers. Conveniently, a single optical fiber operating reflexively can serve both for illumination and for sensing the brightness of the illuminated region or zone of the modulating medium.

By employing optical fibers that serve both as the source of illumination and sensor of scattered light it becomes possible to construct laminated sheets containing planar layers of fibers without the need for a deliberately differentiated structure around the fiber termination/sensing zone. The advantage achieved is that large pressure sensing arrays with a thin cross-section can be constructed at a very low cost.

A further advantage of the use of optical fibers is that such fibers may be deployed to provide a planar array of light sensing fiber ends, organized with a high dimensional density. This is achieved by forming successive, staggered, planar layers of optical fibers, with the ends of the fibers in each layer being positioned to sample light over a linear or narrow, two dimensional zone extending across the width of such layer. The sampling zones of each layer are then positioned to be contiguous to adjacent zones to provide sampling over an enlarged planar area.

An array of individual pressure sensors may be assembled on a carrier sheet using optical fibers, either with the optical sensing fibre ends arranged in alignment or dispersed across a width on the sheet's surface. When the sensing ends are laid-out in a line or narrow band, consecutive layers of planar sensor arrays may be overlaid in receding locations to provide a high density of distributed pressure sensing areas over a near-planar field. In such composite arrays, a common protective cover and a common, illuminated light scattering medium may be applied over the sensor ends.

When a common, illuminated light scattering medium is employed the sensors may be sufficiently separated in their spacing to eliminate interfering "cross-talk" between the sensors. In the case of foam which is translucent, it will have a characteristic scattering length governing the rate at which light from the source of illumination will eventually be effectively extinguished. If cross-talk is to be minimized, the sensor spacings should exceed this extinguishment length, or other specific means to isolate the sensors (such as rendering inter-sensor boundaries non-translucent) should be employed.

The signal output from a single sensor may be led to an optical-to-electronic signal converter for display by an electronic meter. In the case of the outputs of an array, the fiber ends may be assembled in the same order as their distribution on the carrier sheet so that their outputs may be scanned optically by a camera.

One advantage of the invention is that spatially distributed data based on the change in brightness occurring in response to the deformation of a planar light scattering medium is available to be presented visually as a video image. This is effected by employing multiple brightness sensors organized into an array, with the outputs of individual sensors being used to control the brightness of associated pixels within the video image. Images so extracted may then be displayed in the normal manner on a video screen, providing an image that is a pressure map of the pressure state present in the region of each sensor. Alternately, the image may be digitized and analyzed using conventional machine vision technology.

Thus, instead of the discrete optical readout which may be otherwise employed with fiber optic sensors, a bulk video interface may be used. An interface module based on this technology can simultaneously illuminate and read out the signal from over $10^5$ fibres. The video signal from a large array of sensors can be captured and interpreted in real time using existing image capture and analysis technologies or stored electronically for later processing. The video information can be displayed as a conventional RS170 video image in an interpreted or raw format.

The foregoing summarizes the principal features of the invention and some of its optional aspects. The invention may be further understood by the description of the preferred embodiments, in conjunction with the drawings, which now follow.

BRIEF DESCRIPTION OF THE FIGURES

FIG. 10 is a schematic perspective view of the separation of illuminating and sensing fibers.

FIG. 10a is a perspective view of the active ends of alternate illuminating and sensing optical fibers.

FIG. 11 is a perspective view of an alternate layout for optical fibers carried by tapes with two tapes layered one over the other.

DESCRIPTION OF THE PREFERRED EMBODIMENTS

Figure 1:
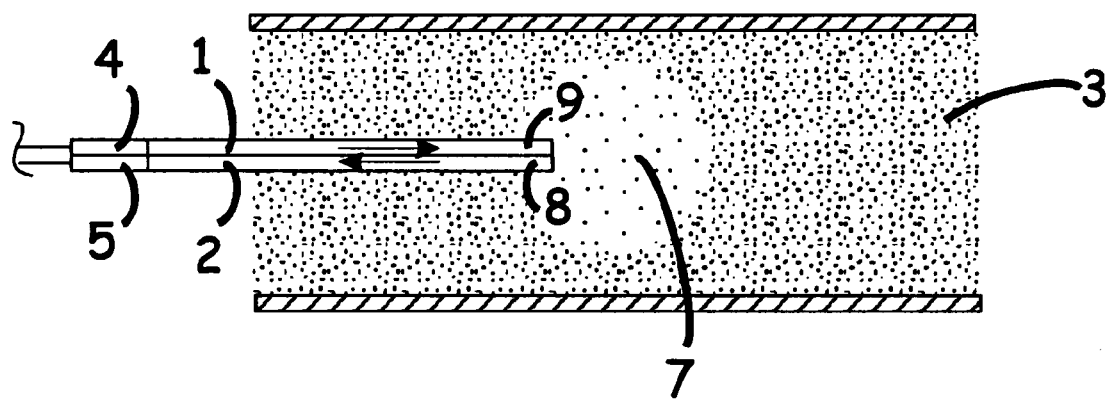
FIG. 1 is a schematic cross-sectional profile of two optic fibers terminating centrally in a body of light scattering foam.

The basic element of an optical scattering geometry sensor according to one variant of the invention consists of an optical fiber transmitter 1 and receiver 2 imbedded in a scattering medium 3. The scattering properties of the medium 3 vary in response to deformation creating an optical signal proportional to the applied pressure. As shown in FIG. 1 a sensor according to the invention can be created by terminating an optical fiber pair 1, 2 in compressible open cell, translucent foam 3. This open cell foam when made of polyurethane is typically white in appearance. This foam 3 has a translucent, self-supporting matrix with millimeter level pore sizes. One optic fiber 1 provides light from a source, such as a light emitting diode 4. The other receives light which is transferred to a photo-diode 5. As described, subsequently, two such optical fibers 1, 2 may be replaced by a single fiber 6 operating in reflex mode.

Figure 2:
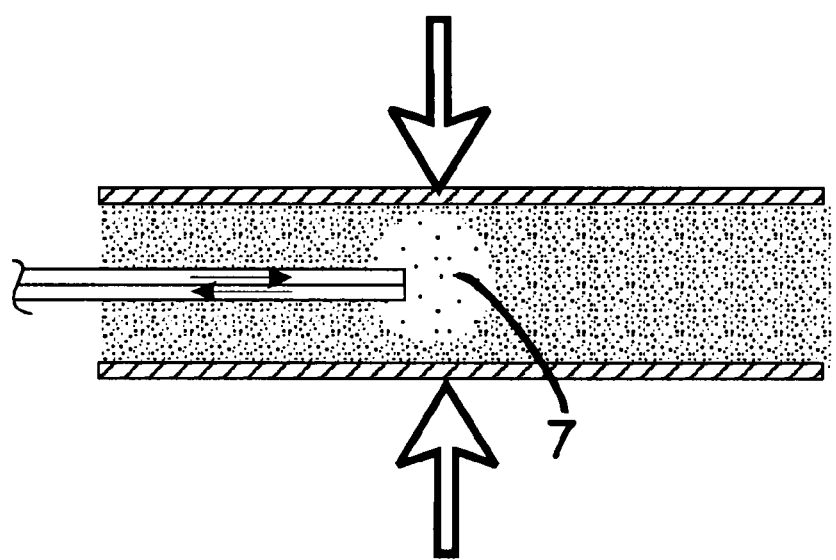
FIG. 2 depicts the configuration of FIG. 1 respectively under compaction.

In FIG. 2 the effect of compression of the scattering medium 3 is shown by the contraction of the volume of the illuminated zone 7 or region within the light scattering foam 3 as pressure is applied. This illumination zone 7 functions as an integrating optical cavity. Not only does this zone 7 contract in volume, but the brightness within its interior increases. By placing the sensing end 8 of the light sensing fiber 2 at a location that remains within the shrinking illuminated volume 7, upon compression, e.g. adjacent to the light source end 9, the sensor 2 will provide an output signal that rises as compaction of the foam 3 increases.

Figure 3:
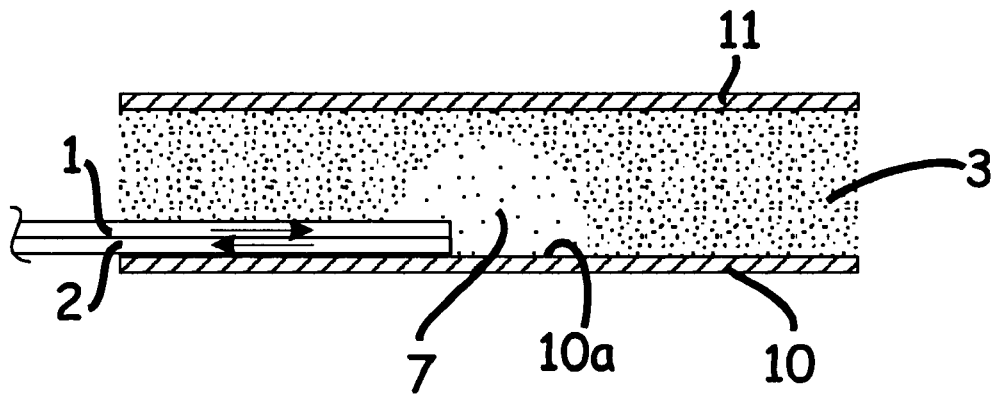
FIGS. 3 and 3a depict the components of FIG. 1 with the fibers adjacent a substrate respectively before and under compaction
Figure 3A:
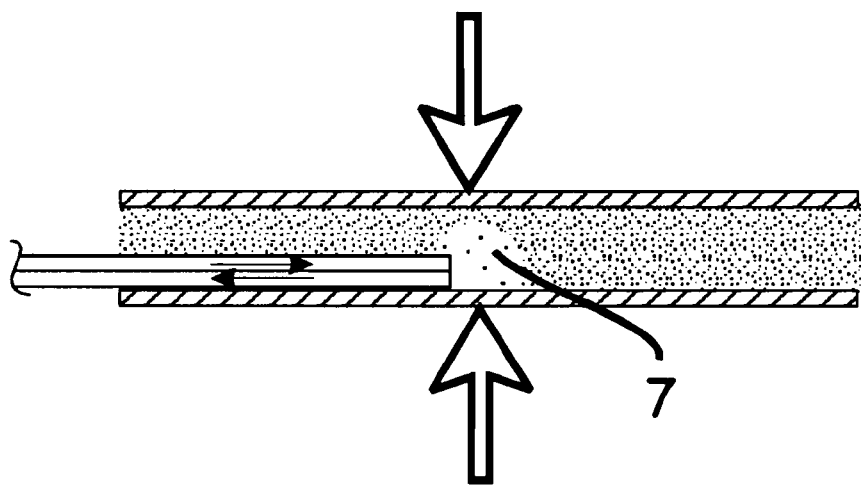

While FIGS. 1 and 2 depict optical fibers that are symmetrically bounded by surrounding foam 3, such fibers 1, 2 may also be located adjacent to a bounding surface or substrate 10 as depicted in FIGS. 3, 3a. The inner surface 10a of this substrate, and of the upper covering layer 11 may be either reflective or absorptive. They may even be transparent if background environmental illuminations are not so high as to render the light sensor 2 insensitive to compression. Opaque bounding surfaces are, however, preferred.

In order to achieve satisfactory performance, it is desirable for the following conditions to be met:

(1) the diameters of the light source and sensor ends 9, 8 should preferably be small compared to the characteristic scattering length of light in the light-scattering medium 3;

(2) the light scattering elements within the medium 3 should preferably be small in comparison to the dimensions of the light source and sensor 9, 8; and (3) the volume of the illuminated zone 7 within the scattering medium should be comparable at least to the characteristic scattering length of the medium 3.

These are approximate parameter boundaries only. The invention can be made to work outside these bounds. The characteristic scattering length of a light scattering medium is the length over which about 63% of the light is scattered. This is based on the factor (1−1/e).

Figure 4:
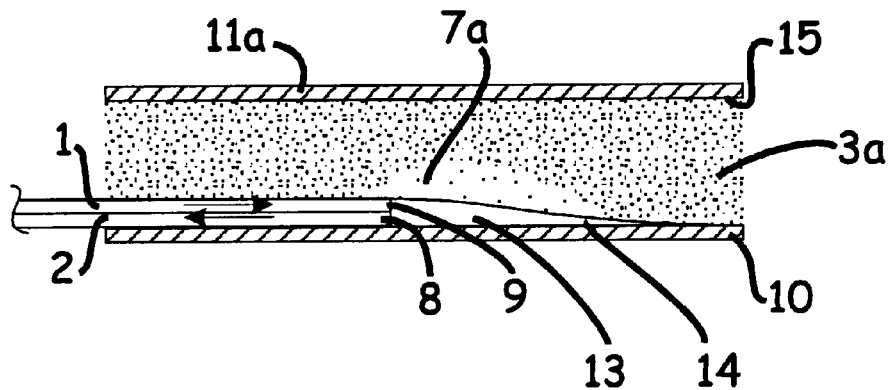
FIG. 4 is a cross-sectional profile of a foam sheet overlying two optical fibers on a substrate.
Figure 5:
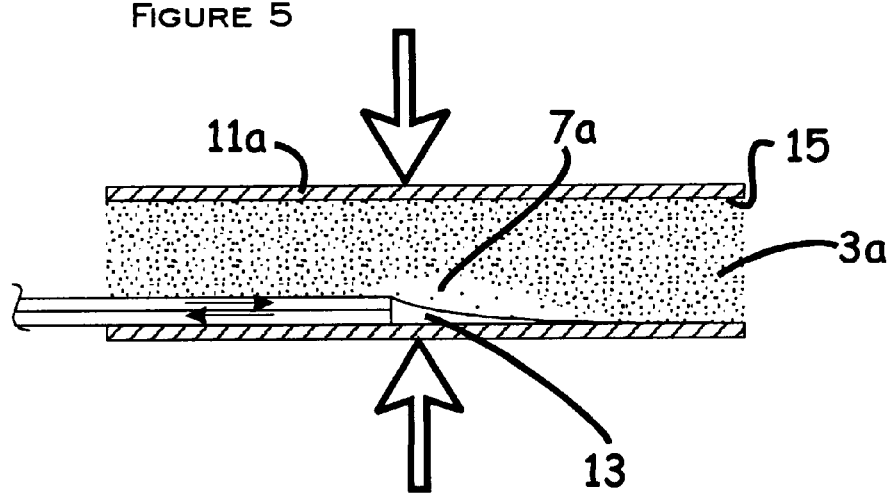
FIG. 5 depicts the configuration of FIG. 4 under compaction.

In FIGS. 4 and 5 a foam sheet 3a is placed to overlie the viewing and illuminating ends 8, 9 of two optical fibers, contained by a lower substrate 10 and upper cover 11. The zone of illumination or optical cavity 7 extends into the foam 3 and is shown in both Figures, before and after the application of compressive pressure. The optical cavity 7 includes the air-filled space 13 and the illuminated portion of the foam 7a. Because the foam 3 is in sheet form 3a, a small cavity 13 exists at the active ends 8, 9 of the fibers 1, 2 separating such ends 8, 9 from the foam 3 by a small gap. As pressure is applied and the foam 3 compresses, this air-filled cavity 13 decreases in volume.

Several mechanisms are believed to be involved in this situation.

(1) If applied as a sheet 3a, the foam 3 is naturally held-away from directly touching the fiber ends 8, 9. This introduces the airspace cavity 13 that decreases the amount of light originating from the lower surface 14 of the foam 3 as "seen" by the sensing fiber 8 when there is no pressure applied. As the foam 3 is compressed, the volume of the air-filled cavity 13 is decreased, which increases the return of scattered, integrated light back to the sensor end 8 and, therefore, the detected brightness.

(2) The foam 3 basically consists of airspaces and intervening polymer material which is translucent. Pressure decreases the airspaces within the foam 3 brightening the illuminated zone 7a of scattered, integrated light within the foam 3;

(3) deflection of the foam layer 3a also brings more light scattering polymer within "range" of both the illuminating 9 and sensing fibers 8, thereby increasing the return signal.

Additionally, the foam sheet 3a may optionally be surmounted by a reflective upper cover 11a with a lower reflective surface 15, which is functional when the foam sheet 3a is used in thicknesses below its light extinction path length. The reflectance of the cover will influence the overall intensity, but will not substantially alter the character of the response. In practice, the upper cover 11a may also be made to be non-transmitting so that stray light is excluded from entering the light scattering medium 3.

The sensing of applied pressure can arise through a combination of effects from all the above mechanisms. Or it can be made to work if the air-filled cavity 13 is eliminated (e.g. if the foam were applied in situ); or if the upper, reflecting cover 11a is not present (e.g. a very thick foam is used so no possibility of stray light interference).

While FIGS. 4 and 5 depict the use of a foam sheet 3a, similar results have been obtained using a solid, flexible, elastically resilient sheet that has a diffusely reflective lower surface. In such an embodiment the signal-generating phenomenon arises virtually exclusively from the first mechanism referenced above.

Figure 6:
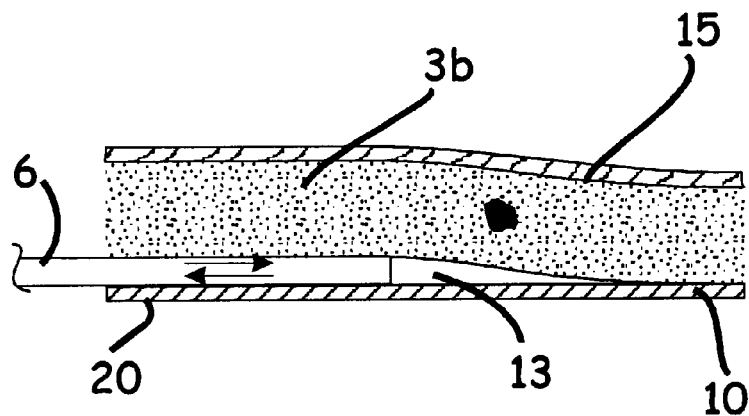
FIG. 6 is a cross-sectional, schematic profile of the sensor of FIG. 4 with a rubber-backed foam sheet.

FIG. 6 illustrates schematically a simplified single sensor system having a reflexively operating optical fiber 6 carried on a substrate 20 and covered by a rubber-backed foam sheet 3b that illustrates the principles incorporated in the sensor depicted in FIGS. 4 and 5. Multiples of this single sensor may be conveniently assembled in the form a "tape" 16 as shown in FIGS. 7 and 8.

Figure 7:
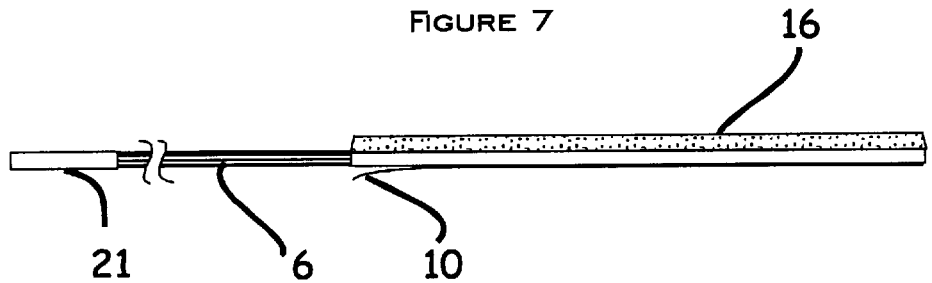
FIG. 7 is a cross-sectional schematic profile view of a tape carrying multiple optical fibers.
Figure 8:
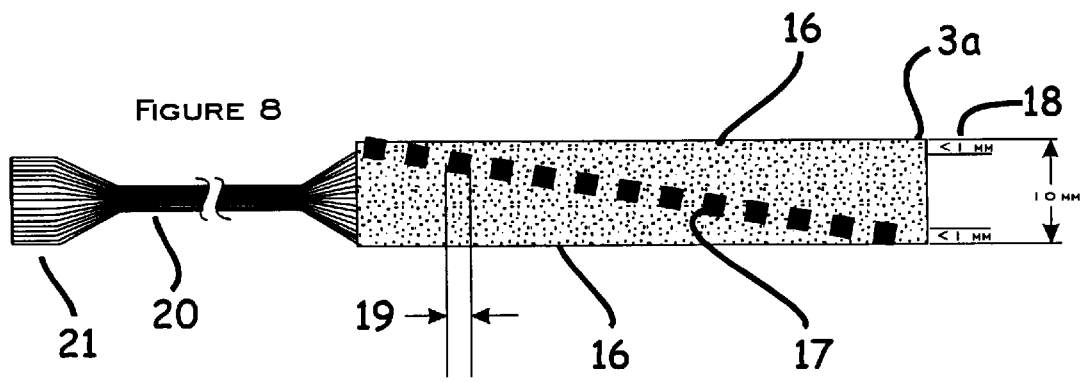
FIG. 8 is a plan view of the tape of FIG. 7.

The tape 16 of FIGS. 7 and 8 has multiple, reflexively operating optical fibers 6, e.g. 32 in number, carried by a substrate 10 of extended length and having a width equal to the space occupied by the fibers 6 plus their interfiber spacings. A 10 millimeter wide tape 16 with 0.25 millimeter diameter fibers 6 on 1 millimeter spacings has been employed. The active ends 17 of the fibers may be displaced from each other not only by inter-fiber spacings 18 but also by being staggered in a diagonal across the width of the tape 16. A longitudinal separation 19 of 10 millimeters has been found acceptable. Beyond the active zone, the fibers 6 may be dressed in a bundle 20 and routed to a connector 21.

Figure 9:
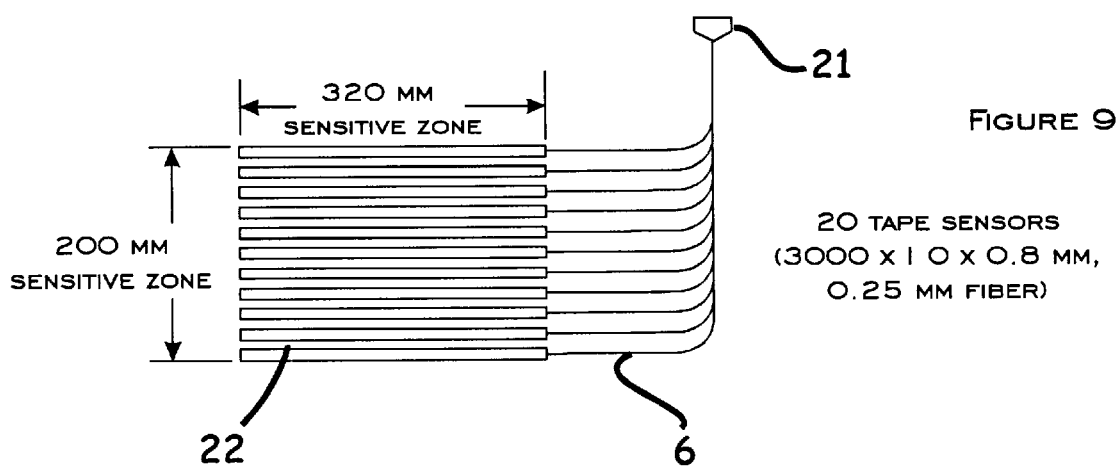
FIG. 9 is a plan view of an array of tapes as in FIG. 7.

Multiple tapes 16 may be assembled in parallel on a common carrier sheet to provide an enlarged sensing surface in the form of an array 22, as shown in FIG. 9. All of the fibers 6 may be lead off to a common connector 21 for delivering signals to a signal presentation system and for common illumination.

Figure 9A:
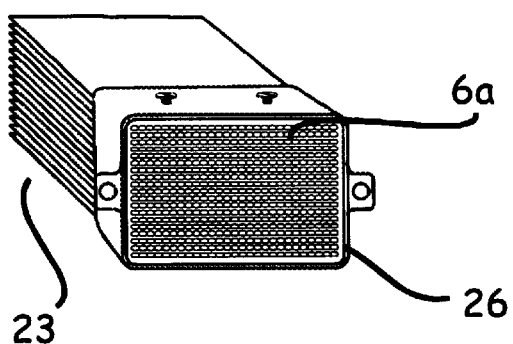
FIG. 9a is a pictorial depiction of a terminator block for optical fibers.

Arrays of sensors have been built up as general purpose, field installable tapes, as shown in FIG. 9. The sensitive length of the array 22 can be installed in a location of interest while the fiber leads 6 can be carried to a convenient location and cut to length at a common terminator block 23, such as that depicted in FIG. 9a, which serves as a special type of connector 21.

In one prototype each tape carried single function illuminating and sensing fibers 1, 2 as shown in FIGS. 10, 10a, which were bifurcated so that alternate fibers 1, 2 were receiving and transmitting, thereby making it not necessary to use a reflex illumination system.

Another alternate format for assembling a sensing array 22a is to arrange the fibers ends 6a in each tape 16 to terminate in a line, so that the "taxels" or pressure sensing fiber ends 6a are contiguous in one dimension as shown in FIG. 11. A layered array 22a may be formed by stacking the tapes 16 to form a staircase-like block of fiber ends 6a that provides a large, sensitized zone of densely positioned taxels.

Figure 12:
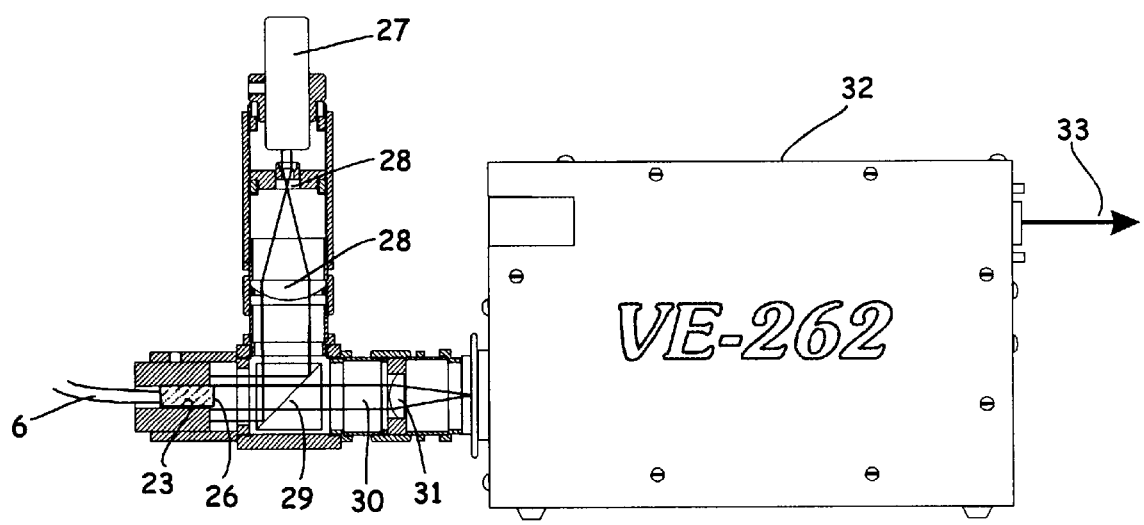
FIG. 12 is a cross-sectional schematic profile of a beam splitter for coupling to the fiber terminator block.

Reflex illumination can be provided using a beam splitter as shown in FIG. 12. In FIG. 11 the terminator block 23 for the optical fibers 6 presents the fiber ends 6a across a face 26 that corresponds to the layout of the taxels on the pressure detecting array 22, 22a. A diode laser 27 emits light that is expanded through a lens system 28 and introduced into the exposed fiber ends 6a held in the termination block 23 after having been reflected at a beam-splitting, semi-transparent, inclined mirror 29. Returning light 30 from the fiber ends 6a passes from the terminator block face 26 through the mirror 29 and optional lenses to be sensed by a light detector. Conveniently, this may be a video camera with a VE-262 interpreter 32.

Figure 13:
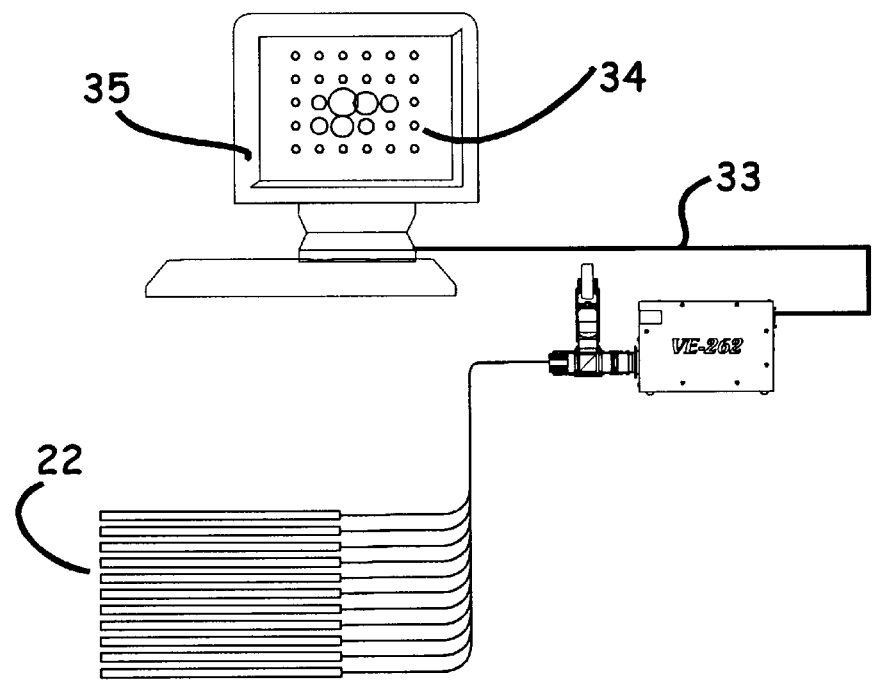
FIG. 13 is a pictorial presentation of the transfer of signals from a pressure mat to a video monitor.

As shown in FIG. 13, the signals 33 arising from the tactile sensing array 22, 22a can be passed in video format to the screen 34 of a video monitor 35 for display using a standard VE-262 interpreter 32.

The tactile mat 22, 22a providing these signals 33 may conveniently be 200 millimeters in width and 320 millimeters in length. Based on 20 tape sensors carrying 32 fibers each an array of 640 (32×20) taxels is provided.

Figure 14:
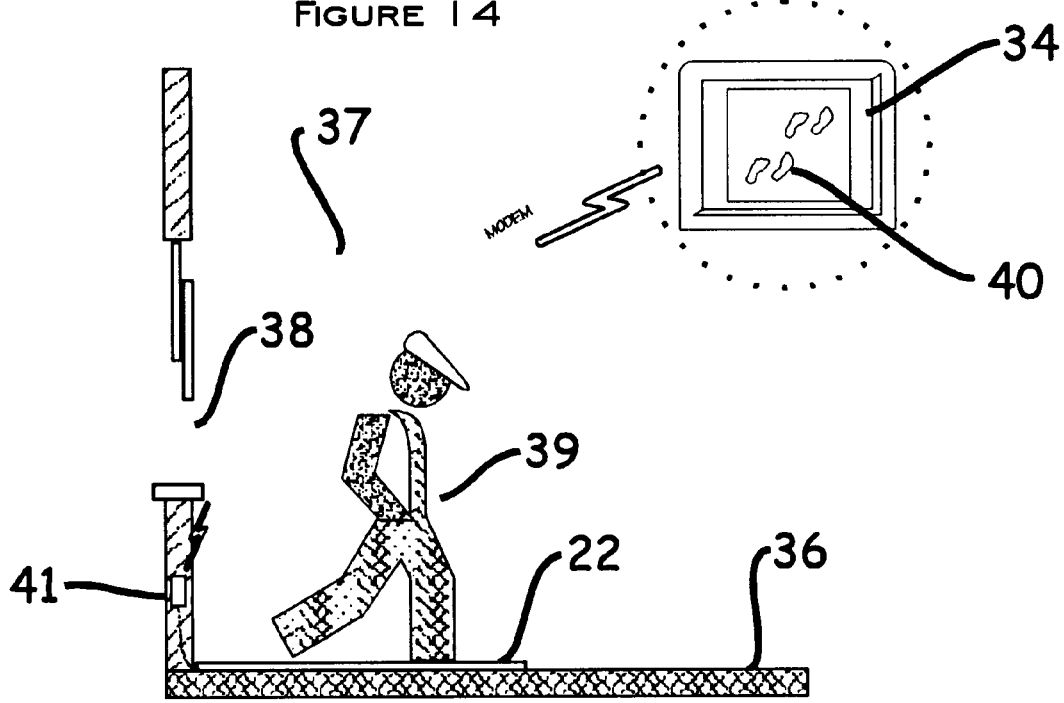
FIG. 14 depicts a pressure mat in a security location to detect an intruder.

Such a mat 22 may be placed in an area where it is desired to detect applied pressure. FIG. 14 shows this mat 22 located on the floor 36 of a building 37, adjacent a window 38, where the presence of an intruder 39 is detected. The image of the footprints 40 formed by the intruder 39 on the mat 22 appear on the video screen 34 as a readily recognizable pattern. Radio or infra-red transmitters 41 may pass signals to a remote location where they may be monitored by a security service.

At the surveillance depot, as the sensor activity can be displayed on a computer monitor as an image of, for example, footprints, the staff will be able to effect a remote interpretation of the activity that was sensed or recorded at the site under surveillance.

The digitized outputs that correspond to the light signals provided by the fiber ends 6 are able to provide both a sensitivity and a dynamic range that exceeds 8 bits. This is accomplished by extending the fiber signal over more than one pixel. The technique is useable when the number of fibers is smaller than the number of pixels. It is generically related to the sub-pixel interpolation techniques that have been applied in the space vision system.

The invention is able to provide static and dynamic signal processing. Static pressure measurement and dynamic event monitoring (e.g., slip, contact, impact). It is also capable of providing contact pattern recognition.

The sensitivity performance of the transducer/interpreter was engineered to provide arbitrarily high sensitivity. Twelve bit sensitivity (1:1000) has been easily demonstrated.

The sensor arrays 22 built up with open cell foam 3 were sensitive to small deformations that occurred with a few grams of applied force. Signal strength increased with increasing deformation up to a maximum of about 1 kg per $cm^2$. There was some hysteresis in the sensor.

The interpreter was able to acquire fiber optic image location information on instruction. It was then able to track changes in signal level and display an interpreted output at a refresh rate of about 15 Hz. The dynamic range and sensitivity was better than 12 bits.

The system design enables delivery of extensive sensory information at a very low cost. A conventional fiber optic tactile sensor with a discrete electronic readout costs about $20 per taxel without signal interpretation. Other types of commercial tactile sensors cost up to $50 per taxel without readout. The cost of a large array of ($10^4$) taxels using conventional tactile readout technology would be in the order of $1 million.

The integration of fiber optic sensing with video technology has two effects:

(1) It reduces the cost of fiber optic sensor preparation and enables the readout of a large number of sensors using a very low cost technology. The signal interface cost can be as low as a few hundred dollars, i.e., about $0.01/sensor of an array of $10^4$ sensors.

(2) The video interface doesn't just capture a signal, it enables access to off-the-shelf signal interpretation capability. Conventional machine vision image analysis technologies can provide the signal acquisition and processing capacity for interpretation of $10^5$ taxels in real time at a cost in the order of $0.01 to $0.1/taxel.

This represents an unprecedented breakthrough in sensory technology.

Figure 15:
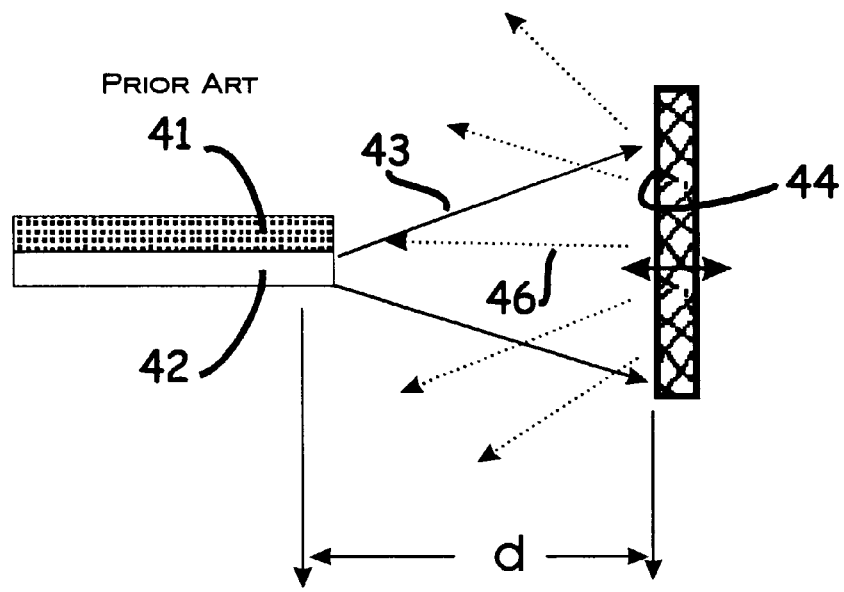
FIG. 15 is a schematic depiction of a prior art system based upon direct reflection.

The invention operates on a different principle than the prior art. FIG. 15 depicts a prior art structure in which a source of light 42 casts a field of illumination 43 on a diffusely reflecting axially located planar surface 44. A detector 41 views the same surface 44. If the surface 44 is displaced axially towards the detector 41, the light intensity measured by the detector 41 based on the direct reception of reflected light 46 will vary in proportion to the inverse of the distance "d" to the power n where n may be between 2 and 4 and where "d" is large compared to the spacing between the source and the detector. This is an embodiment of the prior art.

Figure 16:
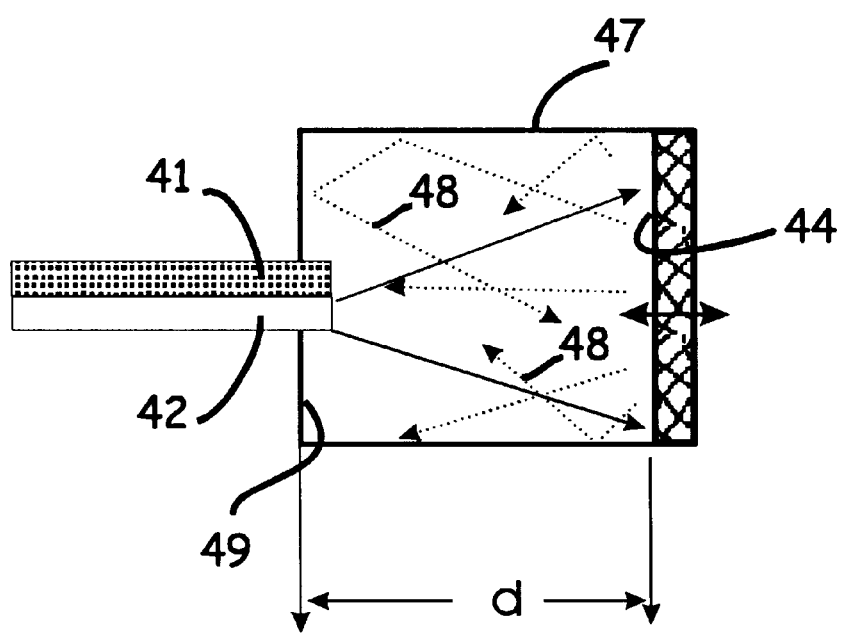
FIG. 16 is a schematic depiction of an integrating optical cavity as exploited by the invention.

By adding diffusely reflecting side walls as shown in FIG. 16 an integrating optical cavity 47 is created. If the source 42 and detector 45 are sufficiently small compared to the dimensions of the cavity 47 and if the "Q" of the cavity 47 is appropriate to the dimensions, then the detected response to axial displacement of the principal reflecting surface 44 will be entirely different. Such response will vary in proportion to the inverse of distance "d" to the power n where n is between 1 and 2. Further, it will vary in the same manner if any surface defining the cavity 47 is displaced, this includes displacement of the wall 49 situated behind the source and detector.

The invention resides in responding to the reflected light 48 which undergoes multiple scattering interactions with the scattering elements of the cavity 47. While walls 44,49 are shown as scattering the light 48, such scattering is equally provided by volumetrically dispersed scattering centers as described above in the case where foam acts as the scattering medium.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property are claimed are as follows:

1. A pressure sensor comprising:
   (1) a compressible carrier medium of wave energy transmitting material having an outer boundary;
   (2) a wave energy source coupled to said carrier medium;
   (3) wave energy scattering centers dispersed within said carrier medium to create a scattered energy volume containing scattered wave energy;
   (4) a wave energy receiver responding to the integrated intensity of scattered wave energy by producing a signal; and
   (5) signal coupling means connected to the wave energy receiver for transferring the signal therefrom to a pressure indicator,
   wherein, upon displacement of the outer boundary, the dimensional volume of the scattered energy volume changes in response to changes in an externally applied pressure to provide a change in the intensity of the scattered wave energy so that a signal is thereby produced to permit the pressure indicator to provide a measure of the applied pressure.

2. A pressure sensor as in claim 1 wherein:
   (1) the compressible carrier medium is of light-transmitting material;
   (2) the wave energy source is a light source;
   (3) the scattering centers dispersed within said carrier medium are light scattering centers; and
   (4) the wave energy receiver is a light detector for sensing scattered light within said carrier medium.

3. A pressure sensor as in claim 2 wherein the light detector does not intercept light or originating directly from the light source.

4. A pressure measuring system comprising:
   (1) a source of illumination;
   (2) a compressible light scattering medium or hollow compressible structure defining an integrating cavity within which light from the source of illumination is diffused and integrated through scattering,
   (3) a light sensing means directed in a viewing direction to sample diffused and integrated light arising from multiple scattering within the integrating cavity and provide a signal indicative of the intensity of the diffused and integrated light; and
   (4) signal coupling means connected to the light sensing means for transferring the signal to a pressure indicator,
   wherein the volume of the integrating cavity changes in response to changes in externally applied pressure to provide a variation in the intensity of the diffused and integrated light so that a signal is thereby produced to permit the pressure indicator to provide a measure of the applied pressure.

5. A pressure measuring system as in claim 4 wherein the volume of the integrating cavity is responsive to external pressure applied in a lateral direction to the viewing direction.

6. A pressure measuring system as in claim 5 wherein the source of illumination is outside the viewing direction.

7. A pressure measuring system comprising:
   (1) a source of illumination providing a field of illumination;
   (2) a light scattering body positioned within the field of illumination to provide an illuminated region that is illuminated by multiply-reflected scattered light, such illuminated region having a volume which is compressible under the application of pressure to the light scattering body;
   (3) a light sensing means directed to view multiply-reflected scattered light from the illuminated region to thereby provide a signal indicative of the intensity of the scattered light within the illuminated region; and
   (4) signal coupling means connected to the light sensing means for transferring the signal to a pressure indicator
   wherein, upon pressure being applied to the light scattering body to effect a change in the volume of the illuminated region a change in the intensity of scattered light within the illuminated region will occur, and the light sensing means provides a signal that corresponds to the amount of the applied pressure to permit the pressure indicator to provide a measure of the applied pressure.

8. A pressure measuring system as in claim 7 wherein the light scattering body is in the form of a flexible sheet having a surface and the illuminated region is a cavity defined in part by a surface of such sheet.

9. A pressure measuring system as in claim 7 wherein the light scattering body is a self-supporting, matrix that is translucent and the illuminated region includes a zone within the matrix wherein light from the source of illumination is being scattered.

10. A pressure measuring system as in claim 7 wherein the light sensing means comprises an optical fiber with a terminal, viewing end directed to receive said scattered light.

11. A pressure measuring system as in claim 10 wherein the source of illumination comprises an optical fiber.

12. A pressure measuring system as in claim 11 wherein the light sensing means and source of illumination both share the same optical fiber.

13. A pressure measuring system as in claims 4, 5, 6, 7, 8, 9, 10, 11 or 12 wherein the source of illumination and light sensing means comprise an array of individual illumination means and individual light sensors to respectively provide:
   (1) multiple localized portions of the field of illumination formed as illuminated locations associated with the light scattering body; and
   (2) multiple individual signals indicative of the intensity of scattered light arising from the associated illuminated locations of the reflecting body
   to permit the pressure indicator to provide a measure of applied pressure at a plurality of discrete locations associated with the array.

14. A pressure measuring system as in claim 13 wherein the array is planar.

15. A pressure measuring system as in claim 13 wherein the array is a first array, formed in a first plane, in combination with a second array of individual illumination means and individual light sensors formed in a second plane wherein:
   (1) the first and second arrays are positioned adjacent to each other with their respective planes parallel or coincident; and
   (2) the individual illuminated locations for which each array provides a measure of applied pressure are laterally displaced from each other so as to be independently exposed to receive applied pressure.

16. A pressure measuring system as in claim 7 further comprising
   an elastically resilient, planar, cover sheet having a light scattering lower surface overlying and at least partially lying within the field of illumination and illuminated region wherein, upon downward deflection within said field of illumination of the cover sheet and said light scattering lower surface under the effect of pressure applied thereto, the apparent brightness of illumination detected by the light sensing means changes as a measure of applied pressure and provides the corresponding signal output from said light sensing means.

17. A pressure sensor as in claim 16 wherein the planar cover sheet is non-transmissive of light to exclude ambient light from entering the field of view.

18. A pressure sensor as in claim 16 wherein the source and detector of illumination are contiguous.

19. A pressure sensor as in claim 16 wherein the cover sheet is formed of a solid elastomeric material.

20. A pressure sensor as in claim 16 wherein the cover sheet comprises a translucent, elastically resilient, light scattering medium that is compressible in the sense of being volumetrically compactable, positioned within the field of view of the detector and the zone of illumination.

21. A pressure measuring system as claim in claim 13 wherein said sensors each comprise an optical fiber and said array of sensors is characterized by a distribution arrangement for sensing a pressure pattern impinging on said apparatus and the signal output from each of said sensors is arranged in an output array corresponding with said distribution arrangement for optical scanning display or viewing for reconstruction of said pressure pattern.

22. A pressure measuring system as claimed in any of claims 4, 5, 6, 7, 8, 9, 10, 11 or 12 further characterized by an optical-to-electronic signal processor associated with each of said sensors for display by an electronic display.

23. A pressure measuring system as claimed in claim 22 wherein said apparatus includes an array of said sensors having a distribution arrangement for sensing a pressure pattern impinging on said apparatus, and the signal output from each of said sensors is arranged in an output array corresponding with said distribution arrangement for optical scanning display or viewing for reconstruction of said pressure pattern.

24. A pressure measuring system as claimed in any of claims 16, 17, 18, 19 or 20 further characterized by an optical-to-electronic signal processor associated with each of said sensors for display by an electronic display.

25. A pressure measuring system as claimed in claim 24 wherein said apparatus includes an array of said sensors having a distribution arrangement for sensing a pressure pattern impinging on said apparatus, and the signal output from each of said sensors is arranged in an output array corresponding with said distribution arrangement for optical scanning display or viewing for reconstruction of said pressure pattern.

* * * * *